United States Patent [19]

Overman

[11] Patent Number: 5,072,705
[45] Date of Patent: Dec. 17, 1991

[54] ROTARY ENGINE AND METHOD

[76] Inventor: Kenneth Overman, Rte. 2, Box 407, Liberty, N.C. 27298

[21] Appl. No.: 658,705

[22] Filed: Feb. 21, 1991

[51] Int. Cl.⁵ .............................................. F02B 53/04
[52] U.S. Cl. ..................................... 123/231; 123/243; 418/92
[58] Field of Search ............. 123/230, 231, 243, 41.42, 123/41.37, 247; 418/91, 92, 93, 99

[56] References Cited

U.S. PATENT DOCUMENTS

| | | | |
|---|---|---|---|
| 939,751 | 11/1909 | Schulz | 123/231 |
| 973,833 | 10/1910 | Wilber | 123/230 |
| 1,090,021 | 3/1914 | Burton et al. | |
| 1,164,136 | 12/1915 | Stevenson | 123/230 |
| 1,193,251 | 8/1916 | Foxgord et al. | |
| 1,237,768 | 8/1917 | Ferguson et al. | |
| 1,363,256 | 12/1920 | Luebeck | 123/230 |
| 1,536,851 | 5/1925 | Hewitt | 418/92 |
| 2,180,352 | 11/1939 | Fahrney | 123/230 |
| 2,215,232 | 9/1940 | Reed | 123/243 |
| 2,231,440 | 2/1941 | Fess | |
| 3,782,107 | 1/1974 | Bendall | 123/231 |
| 3,869,863 | 3/1975 | Juge | |
| 3,893,431 | 7/1975 | Gregg | |
| 4,008,016 | 2/1977 | Goloff | 418/92 |
| 4,826,410 | 5/1989 | Yamamoto et al. | 418/88 |
| 4,854,279 | 8/1989 | Seno | 123/231 |
| 4,920,927 | 5/1990 | Tsusaka et al. | 123/41.42 |
| 4,926,800 | 5/1990 | Valev | 123/41.42 |

FOREIGN PATENT DOCUMENTS

| | | | |
|---|---|---|---|
| 2039626 | 2/1972 | Fed. Rep. of Germany | 123/231 |
| 57-173528 | 10/1982 | Japan | 123/230 |
| 174164 | 12/1934 | Switzerland | 123/231 |
| 279 | of 1914 | United Kingdom | 123/231 |

Primary Examiner—Richard A. Bertsch
Assistant Examiner—David L. Cavanaugh

[57] ABSTRACT

An internal combustion engine of the rotary type has a pair of connected pistons and provides increased power and fuel economy. The fuel combustion chamber includes a single-acting air inlet valve and a double-acting outlet valve. The oil cooling system delivers air through each of the pistons whereby the oil is recirculated after cooling.

22 Claims, 3 Drawing Sheets

ROTARY ENGINE AND METHOD

BACKGROUND OF THE INVENTION

1. Field Of The Invention

The present invention pertains to internal combustion engines and particularly engines of the rotary type.

2. Description Of The Prior Art And Objectives Of The Invention

Various conventional rotary engines utilize two or more internal pistons mounted within a revolving rotor. However, due to the design and operation of the prior art devices they are relatively inefficient and are somewhat costly to operate. With the increase in prices for petroleum products over the last several years, and with expected additional increases in the future, the present invention was conceived and one of its objectives is to provide an internal combustion engine of the rotary type including a pair of opposingly mounted pistons within a rotor which is less costly to operate than conventional rotary engines and can be made smaller which provides increased horsepower.

It is another objective of the present invention to provide a rotary engine having an oil cooling system whereby the oil flows into the rotor shaft channel which communicates with a fluid conduit within a piston rod for circulation through the pistons prior to exiting from the shaft through a return channel.

It is yet another objective of the present invention to provide a rotary engine having a combustion chamber with a single-acting air inlet valve and a double-acting outlet valve.

It is also another objective of the present invention to provide a rotary engine having a combustion chamber which has a teardrop-like configuration.

It is still another objective of the present invention to provide a rotary engine which provides a relatively long torque stroke and which has two fuel combustions per rotor revolution.

Various other objectives and advantages of the present invention become apparent to those skilled in the art as a more detailed explanation is presented below.

SUMMARY OF THE INVENTION

The invention herein demonstrates the components and operation of a rotary type internal combustion engines having a pair of slidable pistons positioned in an eccentrically mounted rotor within the rotor cavity of the engine block. The disk-shaped rotor is sealed within the engine block and a combustion chamber is positioned in the top of the block whereby fuel such as gasoline is ignited therein. The air inlet valve is positioned on the entry side of the combustion chamber and a double-acting outlet valve is positioned at the exit end of the combustion chamber which has a teardrop-like dome shape. The periphery of the rotor disk and piston exposed ends are machined to match the contour of the block rotor cavity to maintain compression and operating efficiency. An oil cooling system passing through the pistons prevents the engine from overheating during running. The method of operation comprises turning the rotor whereby a first piston approaches the combustion chamber with the inlet valve open and the outlet valve closed. When piston rotation places the first piston almost beneath the inlet valve, the inlet valve closes. The piston continues to move past the center of the combustion chamber and as the piston moves past the outlet valve the outlet valve moves upwardly or opens. Immediately before, fuel has been injected into the combustion chamber and ignition now takes place. The first piston is thus driven forward by the combustion and upon continued rotation the second piston which is opposingly mounted to the first forces air towards the inlet valve. As the first piston moves past the exhaust port, the inlet valve opens forcing air into the combustion chamber towards the inlet valve by the second piston. The outlet valve remains open for approximately two degrees rotation whereby the combustion chamber is purged. The outlet valve then closes as the outlet valve enters the combustion chamber floor port 52, and the cycle repeats.

The engine is turbocharged under approximately eight pounds pressure per cubic inch thus providing the inlet port with a constant air supply. Air is constantly moving from the inlet port out of the exhaust port with the exception of the rotation cycle when a piston is between the ports. As the second piston is driven forward towards the exhaust port the forward motion purges the exhaust from the combustion chamber and exhaust gases from the previous combustion are forced out the exhaust port as the piston continues its rotation past the inlet port towards the combustion chamber.

DESCRIPTION OF THE PREFERRED EMBODIMENT

The preferred form of the invention is shown in FIGS. 1, 2, 3 and 4 while the preferred method of operation is illustrated in FIGS. 3A through 3D. As seen therein, the disk-like rotor contains a pair of opposingly mounted pistons which are joined to a pair of piston rods. The piston rods include fluid conduits for oil flow therethrough to cool the engine during operation. A teardrop shaped firing or combustion chamber is shown at the top of the engine as featured in FIG. 1. The sequential valve and rotor movements of the engine as seen in FIGS. 3A through 3D are explained in more detail below.

DETAILED DESCRIPTION OF THE DRAWINGS AND OPERATION OF THE INVENTION

Figure 1:
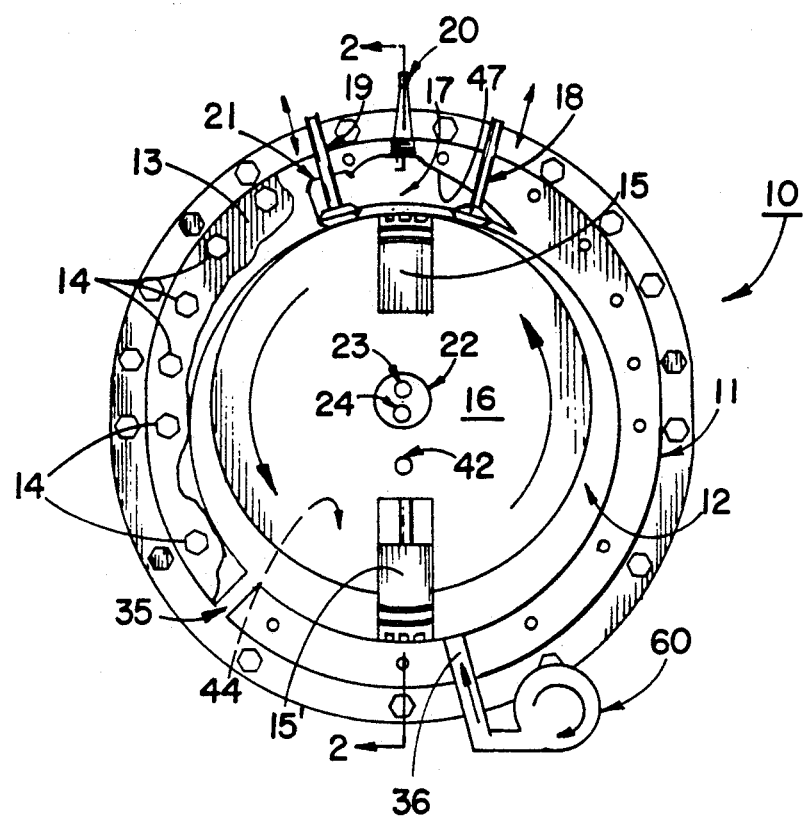
FIG. 1 provides a front elevational view of the rotary engine of the invention with the front block plate substantially removed showing the combustion chamber, turbocharger, valves, pistons, inlet and exit ports.

Turning now to the drawings, rotary engine 10 is shown in FIG. 1 having engine block 11 formed from a conventional cast metal such as aluminum, steel or other suitable materials. Rotor cavity 12 which is shown fully exposed as front end plate 13, which is held in place by block bolts 14 has been cut-away. During rotor 16 rotation, pistons 15, 15' turn with rotor 16 which is eccentrically mounted as seen within rotor cavity 12. Combustion chamber 17 is positioned at the top of engine block 11 and is equipped with air inlet valve 18 and outlet valve 19. Spark plug 20 provides a means to ignite the combustible fuel used, such as gasoline. Outlet valve 19 is of the double-acting type having an upper seat rest surface 49 and a lower seat rest surface 50 which will seat against the lower part or floor 48 of chamber 17 as shown in FIG. 1 or when raised, will close the outlet valve opening 21 in the dome ceiling 47 of combustion chamber 17. As further seen in FIG. 1, combustion chamber 17 has a somewhat teardrop configuration which allows for a substantially larger volume of gases in the left cavity side beyond spark plug 20 and a lesser volume for gases in the entry or right side of chamber 17. Rotor 16 revolves with rotor shaft 22 which comprises fluid conduits 23, 24 for oil or other engine coolants as shown in more detail in FIG. 4. Turbocharger 60 provides an approximate eight pounds per cubic inch air supply to rotor cavity 12.

Figure 4:
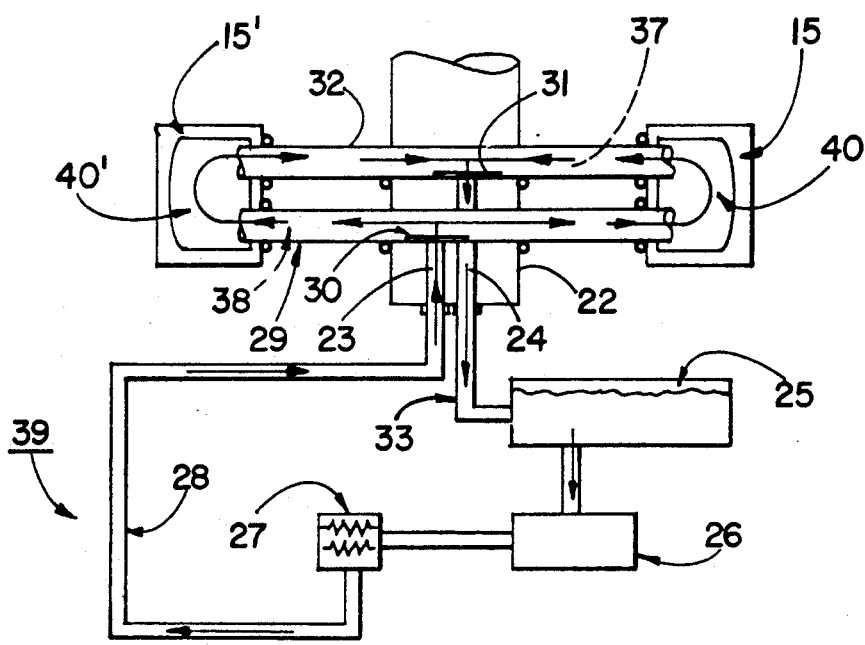
FIG. 4 pictures the oil cooling system of a single cylinder rotary engine.

Oil cooling system 39 of rotary engine 10 is shown in FIG. 4 and includes pump 26 and cooler 27. As would be understood, oil is forced by pump 26 through cooler 27 where it circulates through oil line 28 into fluid inlet channel 23 of rotor shaft 22 which communicates with lower piston rod 29. Piston rod 29 includes a slotted opening 30 which allows fluid to flow between fluid line 28 into lower piston rod conduit 38. As also understood, oil or other coolants flowing through fluid line 28 are forced through lower piston rod 29 into pistons 15, 15' and into upper piston rod conduit 37 where the oil exits through slot 31 in rod 32, through fluid exit channel 24, through return fluid line 33 and into storage tank 25. As seen, pistons 15, 15' are rigidly joined to piston rods 29, 32 and move laterally through shaft 22. Thus, a fluid such as oil circulating through pistons 15, 15' fills cavities 40, 40' within pistons 15, 15' respectively thus helping to keep the pistons relatively cool during operation. Rotor 16 includes an oil fill spout 42 for supplying oil to rotor sump 44 therebeneath within rotor 16.

Figure 2:
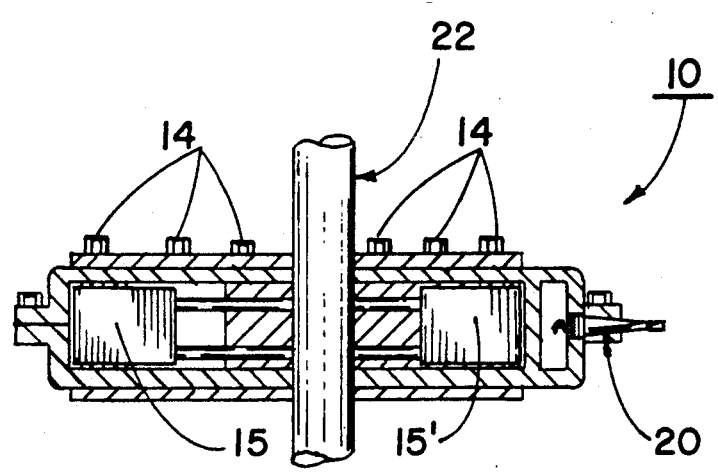
FIG. 2 demonstrates a side cut-away view of the single cylinder rotary engine as shown in FIG. 1.
Figure 5:
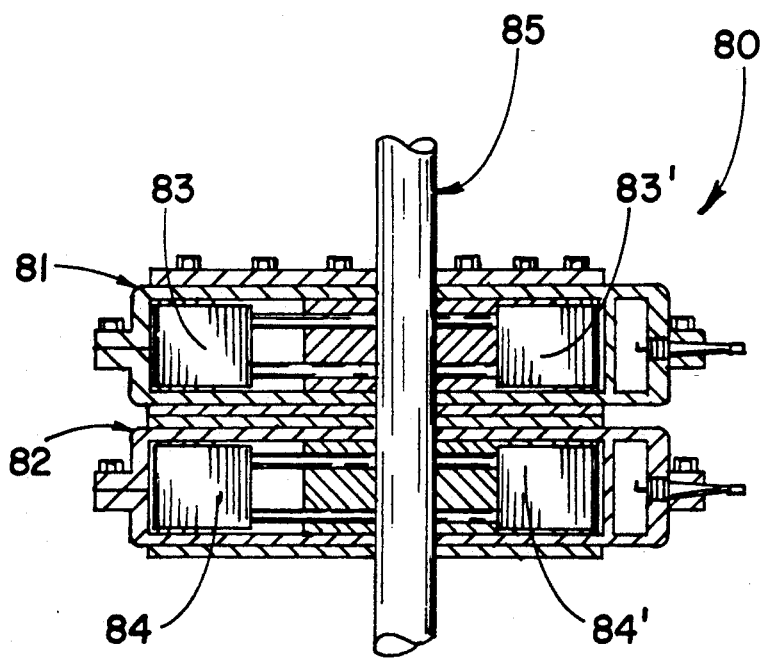
FIG. 5 depicts in schematic fashion a second embodiment of a rotary engine having a pair of independent rotor cylinders.

In FIG. 2 a cross-sectional view is presented of rotary engine 10 as shown in FIG. 1 without the fluid channels within rotor shaft 22 for brevity. FIG. 5 likewise shows a similar cross-sectional view, but of another embodiment, namely a two cylinder engine 80 which could be expanded to include three, four or more cylinders as required, depending on the particular power needed. Rotary engine 80 has two rotor cylinders 81, 82 aligned on shaft 85 with pistons 83, 83' and 84, 84', respectively.

Figure 3A:
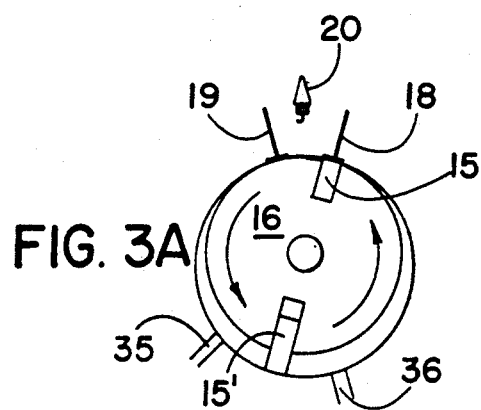
FIG. 3 shows the valve operation relative to the rotor movement in FIGS. 3A through 3D.
Figure 3B:
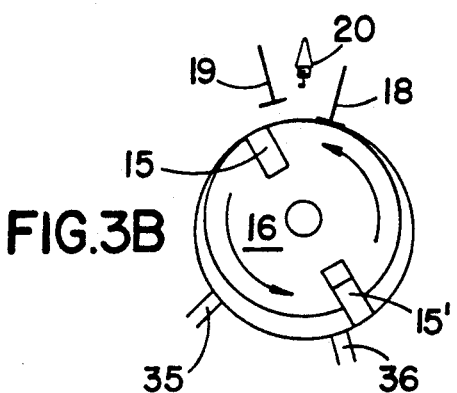
Figure 3C:
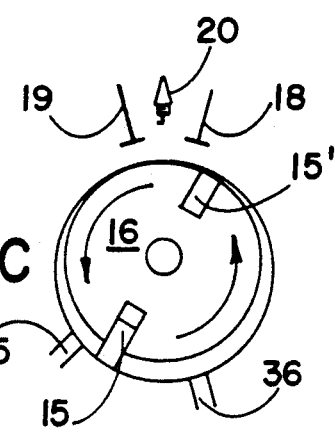
Figure 3D:
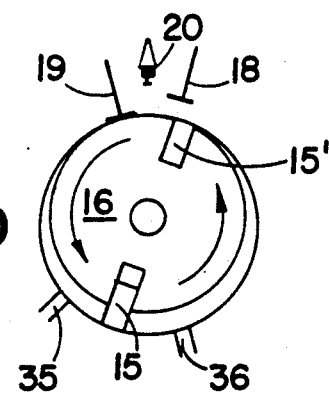

In FIGS. 3A through 3D, the firing sequence and valve operation of rotary engine 10 is shown. In FIG. 3A, rotor 16 turns in a counter-clockwise direction as piston 15 is beneath closed inlet valve 18. In FIG. 3B the counter-clockwise rotation of rotor 16 has continued until fuel injection and ignition. Double-acting outlet valve 19 is closed in its downward position as shown in FIG. 3A. In FIGS. 3B and 3C, outlet valve 19 is open, thereby closing outlet valve opening 21 in ceiling 47 of combustion chamber 17. As spark plug 20 fires in FIG. 3B, outlet valve 19 is open (raised) to allow the compressed gases to drive piston 15 in a counter-clockwise direction within rotor cavity 12. In FIGS. 3A through 3D, the firing of piston 15 is shown. In FIGS. 3C and 3D, a very slight rotor movement of approximately 2° causes outlet valve 19 to go from an upward position in 3C to a downward position in FIG. 3D, thus allowing gases to escape upwardly through dome ceiling 47 prior to fuel injection and combustion.

Exhaust gases within cavity 12 are pushed forward (counter-clockwise) by piston 15 as shown in FIG. 3B for exit through exhaust port 35. Exhaust port 35 is positioned approximately 135° from the top center of rotor cavity 12, beneath spark plug 20 as shown in FIGS. 3A through 3H. This 135° placement provides a long torque stroke of rotor 16 and allows for increased power of engine 10. Air inlet port 36 is shown in FIGS. 3A through 3D at approximately 200° from the top center of block 11 or rotor cavity 12 in a counter-clockwise measure.

Oil seals, rings, electrical components such as timing devices and other electrical circuitry which are conventional in the art are not shown in the drawings presented. Also, the drawings and illustrations do not illustrate a water cooled block which could be provided if desired. Engine 10 is believed functional as both an air cooled and water cooled engine depending on the particular dimensions and size requirements for its intended use and the drawings herein are merely schematic for clarity and the details omitted would be understood as conventional by those skilled in the art since the illustrations and examples provided herein are for explanatory purposes and are not intended to limit the scope of the appended claims.

I claim:

1. A rotary engine comprising: an engine block, said block defining an internal rotor cavity, a rotor, said rotor eccentrically positioned within said cavity, said block defining a combustion chamber, said combustion chamber positioned exteriorly of said rotor cavity and in fluid communication therewith, a pair of pistons, said pistons affixed to each other and slidably mounted within said rotor, an air inlet valve, said inlet valve positioned at one side of said combustion chamber, a dual acting outlet valve, said outlet valve comprising a top and a bottom rest, said outlet valve positioned at the other side of said combustion chamber, said combustion chamber defining both an outlet valve ceiling port and an outlet valve floor port, means to ignite fuel, said fuel ignition means located within said combustion chamber between said inlet and outlet valves, said block defining an exhaust port, said exhaust port spaced circumferentially from said combustion chamber and in fluid communication with said rotor cavity, said block defining an inlet port, and said inlet port circumfrentially spaced from said outlet port and in fluid communication with said rotor cavity.

2. A rotary engine as claimed in claim 1 and including a piston rod, said rod extending through said rotor, each of said pair of pistons attached to said rod at opposite ends thereof.

3. A rotary engine as claimed in claim 2 wherein said piston rod comprises a fluid conduit.

4. A rotary engine as claimed in claim 3 and including a rotor shaft, said shaft slidably affixed to said fluid conduit.

5. A rotary engine as claimed in claim 4 wherein said rotor shaft includes a fluid channel, said fluid channel communicating with said fluid conduit.

6. A rotary engine as claimed in claim 2 wherein said piston rod comprises a pair of cylindrical rods, said rods each defining a fluid conduit therethrough, and each of said rods defining a longitudinal opening therein.

7. A rotary engine as claimed in claim 1 and including means to cool said engine.

8. A rotary engine as claimed in claim 7 wherein said engine cooling means comprises fluid conduits, said conduits extending through said pistons.

9. A rotary engine as claimed in claim 8 wherein said conduits contain oil.

10. A rotary engine as claimed in claim 7 wherein said engine cooling means comprises: an inlet oil conduit, said conduit extending through said pistons, an oil storage tank, a pump, said pump joined to said storage tank, an oil cooler, said oil cooler in fluid communication with said conduit and with said pump whereby oil will circulate through said pistons into said storage tank and through said oil cooler for return to said pistons.

11. A rotary engine as claimed in claim 1 wherein said combustion chamber is dome-shaped.

12. A rotary engine as claimed in claim 11 wherein said combustion chamber is teardrop shaped.

13. A rotary engine as claimed in claim 11 wherein said ignition means is mounted in the top of said dome.

14. A rotary engine as claimed in claim 1 wherein said outlet port is positioned approximately 135° from the top of said rotor cavity.

15. A rotary engine as claimed in claim 7 wherein said rotor has a disk-like configuration.

16. A rotary engine as claimed in claim 1 wherein said inlet port is positioned approximately 200° from the top of said rotor cavity.

17. A method of operating a rotary type internal combustion engine having a rotor with a pair of pistons positioned in an engine block cavity, the block defining a dome-shaped combustion chamber, said combustion chamber comprising an air inlet valve, said combustion chamber defining both an outlet valve ceiling port and a floor port, a double-acting outlet valve and a means to ignite the fuel, the method comprising the steps of:

(a) turning the rotor whereby the first piston moves towards the combustion chamber while the inlet valve is closed and said outlet valve is seated within said dome ceiling port;
(b) opening the inlet valve to allow air into the combustion chamber while maintaining the outlet valve open as the first piston continues to approach the combustion chamber;
(c) closing the outlet valve by seating said valve in the combustion chamber floor port;
(d) injecting fuel into the combustion chamber;
(e) opening the outlet valve; and
(f) igniting the fuel therein.

18. The method of claim 17 and including the further steps of:
(a) driving the second piston proximate the inlet valve;
(b) opening the inlet valve while maintaining the outlet valve seated within the ceiling port;
(c) forcing cavity gases through said inlet and said outlet valve cylinders; and
(d) closing said outlet valve by seating said outlet valve in said floor port of said combustion chamber.

19. The method of claim 18 and repeating the steps for additional rotor pistons.

20. A rotary engine as claimed in claim 1 wherein said engine block defines a plurality of rotor cavities.

21. A rotary engine as claimed in claim 20 wherein said rotor cavities are axially aligned.

22. A rotary engine as claimed in claim 20 wherein said engine block defines two rotor cavities.

* * * * *